US012573009B2

(12) United States Patent
Zhou et al.

(10) Patent No.: US 12,573,009 B2
(45) Date of Patent: Mar. 10, 2026

(54) IMAGE PROCESSING METHOD, IMAGE GENERATING METHOD, APPARATUS, DEVICE, AND MEDIUM

(71) Applicant: Beijing Zitiao Network Technology Co., Ltd., Beijing (CN)

(72) Inventors: Caijin Zhou, Beijing (CN); Xinghong Hu, Beijing (CN); Yunhao Li, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 313 days.

(21) Appl. No.: 18/259,954

(22) PCT Filed: Jan. 26, 2022

(86) PCT No.: PCT/CN2022/074130
§ 371 (c)(1),
(2) Date: Jun. 29, 2023

(87) PCT Pub. No.: WO2022/170982
PCT Pub. Date: Aug. 18, 2022

(65) Prior Publication Data
US 2024/0095886 A1 Mar. 21, 2024

(30) Foreign Application Priority Data
Feb. 9, 2021 (CN) .......................... 202110180562.9

(51) Int. Cl.
*G06T 5/70* (2024.01)
*G06T 5/73* (2024.01)
(Continued)

(52) U.S. Cl.
CPC .................. *G06T 5/70* (2024.01); *G06T 5/73* (2024.01); *G06T 7/11* (2017.01); *G06T 7/13* (2017.01);
(Continued)

(58) Field of Classification Search
None
See application file for complete search history.

(56) References Cited

U.S. PATENT DOCUMENTS

| | | |
|---|---|---|
| 2006/0082579 A1 | 4/2006 | Yao |
| 2011/0235905 A1 | 9/2011 | Yokokawa |
| (Continued) | | |

FOREIGN PATENT DOCUMENTS

| | | | |
|---|---|---|---|
| CN | 109068122 A | 12/2018 | |
| CN | 110021050 A * | 7/2019 | ........... G06T 11/001 |
| (Continued) | | | |

OTHER PUBLICATIONS

Chen, X., "The Research and Implementation of Image Style Transfer Algorithm Based on Deep Learning," J. Changchun Inst. Tech. (Nat. Sci. Edi.), vol. 21, No. 2, 2020, 6 pages.
(Continued)

*Primary Examiner* — Yi Wang
(74) *Attorney, Agent, or Firm* — Alleman Hall LLP

(57) ABSTRACT

Embodiments of the present disclosure relate to an image processing method, an image generating method, an apparatus, a device and a medium. The image processing method may include: acquiring an original image; determining a comic image corresponding to the original image; acquiring line information and color block information of the comic image; determining, according to the line information and the color block information of the comic image, a paper-cut image corresponding to the original image.

18 Claims, 8 Drawing Sheets

Original image

Paper-cut image

Perform information extraction based on the original image

Determine a comic image

Comic image

Perform information extraction based on the comic image

Paper-cut image

(51) Int. Cl.

| | | |
|---|---|---|
| *G06T 7/11* | (2017.01) | |
| *G06T 7/13* | (2017.01) | |
| *G06T 7/90* | (2017.01) | |
| *G06T 11/60* | (2006.01) | |
| *G06V 10/44* | (2022.01) | |
| *G06V 10/56* | (2022.01) | |

(52) U.S. Cl.
CPC ................ *G06T 7/90* (2017.01); *G06T 11/60* (2013.01); *G06V 10/44* (2022.01); *G06V 10/56* (2022.01); *G06T 2207/10024* (2013.01); *G06T 2207/20021* (2013.01); *G06T 2207/20081* (2013.01); *G06T 2207/20084* (2013.01); *G06T 2207/20192* (2013.01); *G06T 2207/30201* (2013.01)

(56) References Cited

U.S. PATENT DOCUMENTS

| | | | |
|---|---|---|---|
| 2018/0357800 | A1 | 12/2018 | Oxholm et al. |
| 2022/0044352 | A1* | 2/2022 | Liao .................... G06F 18/2135 |

FOREIGN PATENT DOCUMENTS

| | | | |
|---|---|---|---|
| CN | 110210347 | A | 9/2019 |
| CN | 110930297 | A | 3/2020 |
| CN | 111127304 | A | 5/2020 |
| CN | 111696028 | A | 9/2020 |
| CN | 112102153 | A | 12/2020 |
| CN | 112991151 | A | 6/2021 |
| JP | 2003242496 | A | 8/2003 |
| JP | 2009521065 | A | 5/2009 |
| JP | 2010026914 | A | 2/2010 |
| JP | 2011180643 | A | 9/2011 |
| JP | 2013246578 | A | 12/2013 |
| JP | 2014529233 | A | 10/2014 |
| WO | 202091891 | A1 | 5/2020 |

OTHER PUBLICATIONS

Chen, Y. et al., "CartoonGAN: Generative Adversarial Networks for Photo Cartoonization," IEEE/CVF Conference on Computer Vision and Pattern Recognition, 2018, 10 pages.

China National Intellectual Property Administration, Notice of Allowance Issued in Application No. 202110180562.9, Oct. 19, 2022, 6 pages.

China National Intellectual Property Administration, Office Action and Search Report Issued in Application No. 202110180562.9, Dec. 24, 2021, 18 pages.

China National Intellectual Property Administration, Notice of Allowance Issued in Application No. 202110180562.9, Mar. 18, 2022, 14 pages.

China National Intellectual Property Administration, Notice of Allowance Issued in Application No. 202110180562.9, Jul. 8, 2022, 7 pages.

Ji, Xinyu et al., "Image rapid style transfer based on improved perceived loss function," Electronic Technology and Software Engineering, 2021, 6 pages. Submitted with English abstract.

China National Intellectual Property Administration, International Search Report and Written Opinion Issued in Application No. PCT/CN2022/074130, Mar. 31, 2022, WIPO, 14 pages.

Wang N. et al., "Platform for Transforming Images into Paper-cuttings Based on Deep Learning and Image Processing Algorithms," Computer Knowledge and Technology, vol. 14, No. 25, Sep. 2018, 5 pages. Submitted with English abstract.

Meng, M. et al., "Artistic Paper-Cut of Human Portraits," Proceedings of the ACM Multimedia 2010 International Conference (MM '10), Oct. 25, 2010, Firenze, Italy, 4 pages.

European Patent Office, Extended European Search Report Issued in Application No. 22752143.2, May 6, 2024, 9 pages.

Japan Patent Office, Office Action Issued in Application No. 2023-541027, May 28, 2024, 7 pages.

Winnemöller, H. et al., "XDoG: An extended difference-of-Gaussians compendium including advanced image stylization," Computers & Graphics, vol. 36, No. 6, Oct. 1, 2012, 14 pages.

* cited by examiner

Acquire an original image — S101

Determine a comic image corresponding to the original image — S102

Acquire line information and color block information of the comic image — S103

Determine, according to the line information and the color block information of the comic image, a paper-cut image corresponding to the original image — S104

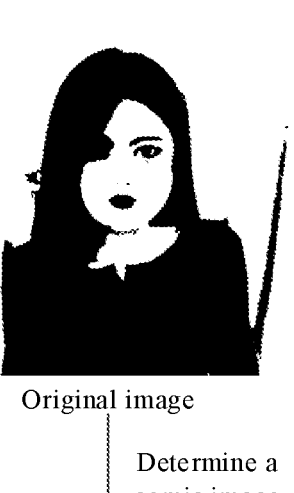
Original image
Perform information
extraction based on
the original image
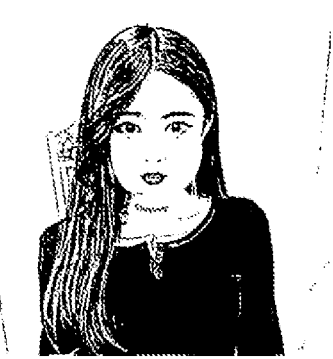
Paper-cut image
Determine a
comic image
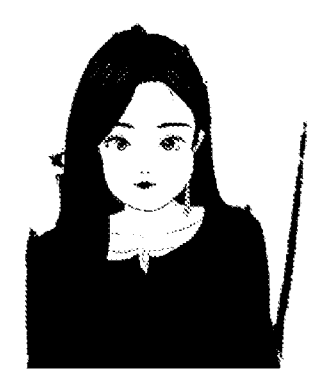
Comic image
Perform
information
extraction based on
the comic image
Paper-cut image
FIG. 2

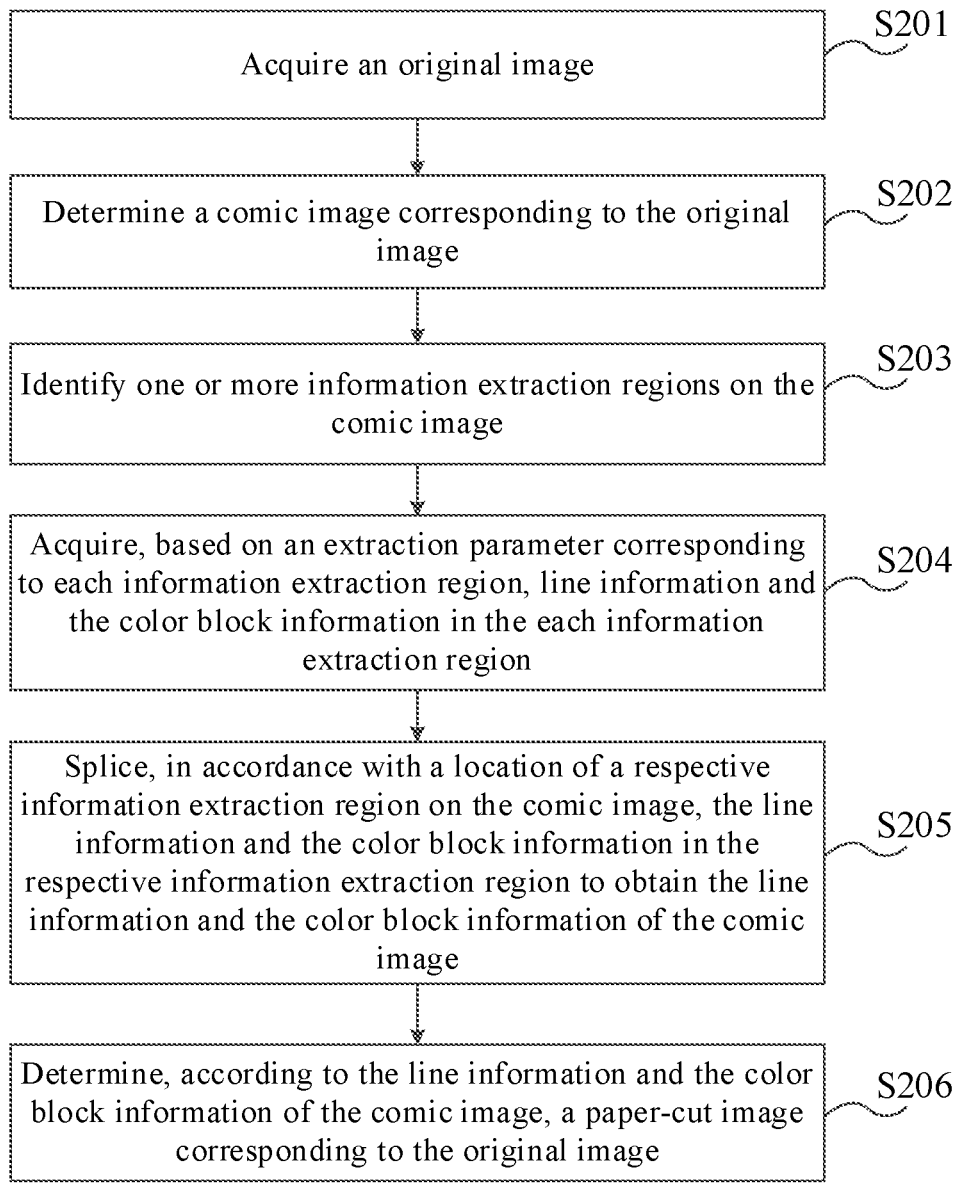

Acquire an original image ~S201

Determine a comic image corresponding to the original image ~S202

Identify one or more information extraction regions on the comic image ~S203

Acquire, based on an extraction parameter corresponding to each information extraction region, line information and the color block information in the each information extraction region ~S204

Splice, in accordance with a location of a respective information extraction region on the comic image, the line information and the color block information in the respective information extraction region to obtain the line information and the color block information of the comic image ~S205

Determine, according to the line information and the color block information of the comic image, a paper-cut image corresponding to the original image ~S206

FIG. 3

Original image

Information extraction result for a
face region

Comic image

Information extraction result for a
hair region

Splicing result

Information extraction result for a target
body region

Candidate image

Preset
processing

Paper-cut image

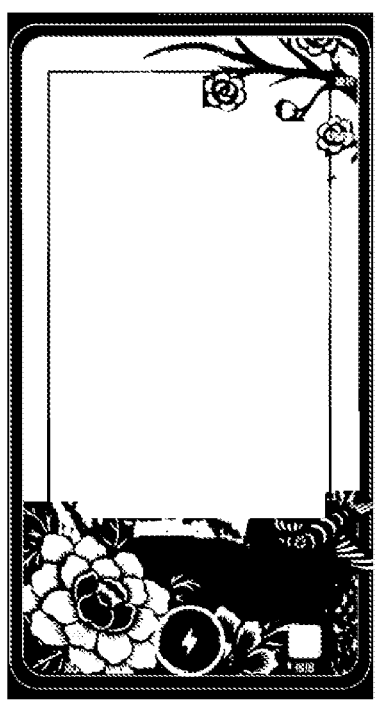
FIG. 8
Feature enhancement
processing and/or
deblurring processing
FIG. 9

400

500

IMAGE PROCESSING METHOD, IMAGE GENERATING METHOD, APPARATUS, DEVICE, AND MEDIUM

CROSS-REFERENCE TO RELATED APPLICATIONS

This application is a national stage of International Application No. PCT/CN2022/074130, filed on Jan. 26, 2022, which claims priority to Chinese Patent Application No. 202110180562.9, filed on Feb. 9, 2021. Both of the aforementioned applications are hereby incorporated by reference in their entireties.

TECHNICAL FIELD

The present disclosure relates to the field of image processing technologies and, in particular, to an image processing method, an image generating method, an apparatus, a device, and a medium.

BACKGROUND

At present, with the gradual enrichment of functions of video interactive applications, image style transformation has become a new interesting gameplay. The image style transformation refers to perform style transformation on one or more images to generate a style image that meets requirements of users.

However, the types of style transformation supported in existing video interactive applications are still limited, which cannot meet requirements of generating personalized style images from users.

SUMMARY

In order to solve the above technical problems or at least partially solve the above technical problems, embodiments of the present disclosure provide an image processing method, an image generating method, an apparatus, a device and a medium.

In a first aspect, an embodiment of the present disclosure provides an image processing method, including:

acquiring an original image;

determining a comic image corresponding to the original image;

acquiring line information and color block information of the comic image;

determining, according to the line information and the color block information of the comic image, a paper-cut image corresponding to the original image.

In a second aspect, an embodiment of the present disclosure provides an image generating method, including:

acquiring a to-be-processed image;

obtaining, by using a paper-cut style image generation model, a paper-cut style image corresponding to the to-be-processed image;

where the paper-cut style image generation model is obtained by training based on an original image and a paper-cut image corresponding to the original image, and the paper-cut image is obtained based on any one of the image processing methods provided by the embodiments of the present disclosure.

In a third aspect, an embodiment of the present disclosure provides an image processing apparatus, including:

an original image acquiring module, configured to acquire an original image;

a comic image determining module, configured to determine a comic image corresponding to the original image;

a line and color block information acquiring module, configured to acquire line information and color block information of the comic image;

a paper-cut image generating module, configured to determine, according to the line information and the color block information of the comic image, a paper-cut image corresponding to the original image.

In a fourth aspect, an embodiment of the present disclosure provides an image generating apparatus, including:

a to-be-processed image acquiring module, configured to acquire a to-be-processed image;

a paper-cut style image generating module, configured to obtain, by using a paper-cut style image generation model, a paper-cut style image corresponding to the to-be-processed image;

where the paper-cut style image generation model is obtained by training based on an original image and a paper-cut image corresponding to the original image, and the paper-cut image is obtained any one of the image processing methods provided by the embodiments of the present disclosure.

In a fifth aspect, an embodiment of the present disclosure further provides an electronic device, including a memory and at least one processor, where computer programs are stored in the memory, and when the computer programs are executed by the at least one processor, the electronic device is enabled to implement any one of the image processing methods or image generating methods provided by the embodiments of the present disclosure.

In a sixth aspect, an embodiment of the present disclosure further provides a computer readable storage medium, having computer programs stored thereon, where when the computer programs are executed by a computing device, the computing device is enabled to implement any one of the image processing methods or image generating methods according to the embodiments of the present disclosure.

In a seventh aspect, an embodiment of the present disclosure provides a computer program product, including computer programs, where the computer programs are stored in a readable storage medium, at least one processor of an electronic device can read the computer programs from the readable storage medium, and the at least one processor executes the computer programs, and enables the electronic device to implement any one of the image processing methods or image generating methods provided by the embodiments of the present disclosure.

In an eighth aspect, an embodiment of the present disclosure further provides a computer program, where the computer program is stored in a readable storage medium, at least one processor of an electronic device can read the computer program from the readable storage medium, the at least one processor executes the computer program, and enables the electronic device to implement any one of the image processing methods or image generating methods provided by the embodiments of the present disclosure.

Compared with the prior art, the technical solutions provided by the embodiments of the present disclosure have at least the following advantages: in the embodiments of the present disclosure, by extracting line information and color block information based on a comic image of an original image, an extraction effect of the line information and the color block information on the original image is improved. A new paper-cut image generating method is provided by using the line information and the color block information extracted based on the comic image to generate a required paper-cut image, thus ensuring a high-quality display effect of the paper-cut image and enriching an image processing function supported by an electronic device, further enriching transformation types of style images supported by the electronic device, and solving the problem that transformation types of style images supported in existing solutions are limited and cannot meet generating requirements of style images from users.

BRIEF DESCRIPTION OF DRAWINGS

The drawings herein are incorporated in and constituted a part of the specification, which illustrate embodiments consistent with the present disclosure and together with the description serve to explain the principles of the present disclosure.

In order to illustrate the embodiments of the present disclosure or the technical solutions in the prior art more clearly, the drawings needed to be used in the embodiments or the description of the prior art will be introduce briefly in the following. Obviously, for those of ordinary skill in the art, other drawings can be obtained from these drawings without paying creative labor.

FIG. 2 is a schematic diagram of an extraction result of line information and color block information provided by an embodiment of the present disclosure.

FIG. 3 is a flowchart of another image processing method provided by an embodiment of the present disclosure.

FIG. 8 is a schematic diagram of another paper-cut style template image provided by an embodiment of the present disclosure.

FIG. 9 is a schematic diagram of a comparison of paper-cut style images provided by an embodiment of the present disclosure.

DESCRIPTION OF EMBODIMENTS

In order to understand the above objects, features and advantages of the present disclosure more clearly, the solutions of the present disclosure will be further described below. It should be noted that the embodiments of the present disclosure and the features in the embodiments may be combined with each other without conflict.

Many specific details are illustrated in the following description to facilitate a full understanding of the present disclosure, but the present disclosure may also be implemented in other ways different from those described herein; obviously, the embodiments in the specification are only part of the embodiments of the present disclosure, not all embodiments.

Figure 1:
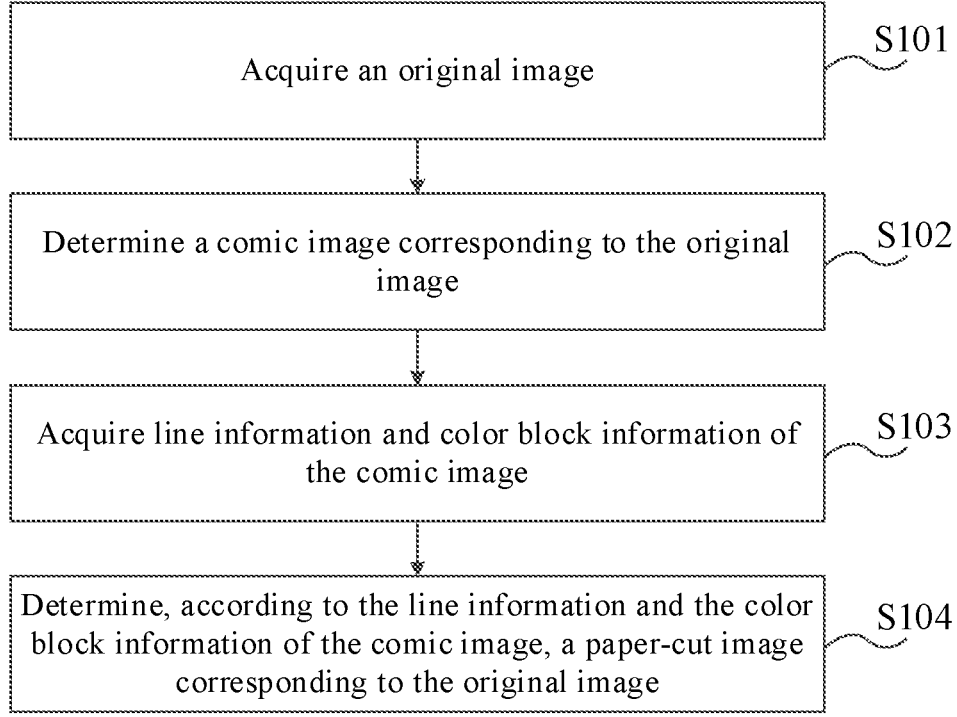
FIG. 1 is a flowchart of an image processing method provided by an embodiment of the present disclosure.

FIG. 1 is a flowchart of an image processing method provided by an embodiment of the present disclosure, which can be applied to a situation of how to generate a paper-cut image. The method may be executed by a paper-cut image processing apparatus, which may be implemented by software and/or hardware, and may be integrated on any electronic devices with computing capabilities, such as various user terminals or servers.

In the embodiment of the present disclosure, the paper-cut image refers to a style image with a paper-cut effect, which is formed by lines and color blocks with preset colors. For any original images, by adopting the image processing method provided by the embodiments of the present disclosure, a paper-cut image corresponding to an original image may be obtained, thus enriching image stylization requirements and improving user experience. In addition, the paper-cut image obtained by adopting the method in the embodiments of the present disclosure, not only maintains a high similarity with the original image, but also has smooth lines and clean color blocks without noise. The preset color of the paper-cut image may be determined according to specific generating requirements of the paper-cut image. For example, it may be a color related to a specific festival, such as red, which is not specifically limited in the embodiments of the present disclosure.

As shown in FIG. 1, the image processing method according to the embodiments of the present disclosure may include:

S101, acquire an original image.

The original image may be any type of image, such as a face image, an animal image, a scenery image, and the like. Exemplarily, an electronic device may obtain the original image by invoking a photographing apparatus for shooting, or may obtain the original image through a user's image uploading operation, and may also obtain the original image by means of Internet data collection.

S102, determine a comic image corresponding to the original image.

The comic image refers to an image with a comic style, such as an image with a comic style of a specific region, etc. The comic image corresponding to the original image has a high similarity with the original image. Exemplarily, a comic image corresponding to the original image may be obtained by using a pre-trained comic style image generation model. The comic style image generation model has a function of generating comic images, for example, it can be trained based on a generative adversarial nets model, but of course it is not limited thereto.

S103, acquire line information and color block information of the comic image.

After the comic image is acquired, the line information and the color block information on the comic image may be extracted by using any available algorithm with a specific frequency information extraction function, for example, by using any available band-pass filtering algorithm such as an xdog algorithm.

Compared with cluttered extracted line information and color block information resulted from a cluttered pixel color distribution on the original image, in the comic image, a pixel color is relatively undiversified, a color distribution is uniform, the extracted line information is relatively smooth, and the color block information is relatively clean. According to the embodiments of the present disclosure, a high-quality display effect of the paper-cut image is ensured by extracting the line information and the color block information based on the comic image.

In an implementation, the obtaining the line information and the color block information of the comic image includes:

identifying one or more information extraction regions on the comic image; where the specific number of information extraction regions may be preset, or may be determined by identifying different color regions on the comic image; the identification of different color regions may be realized by using any available existing image processing algorithms (for example, a target detection and recognition algorithm, etc.), which is not specifically limited in the embodiments of the present disclosure;

acquiring, based on an extraction parameter corresponding to each information extraction region, line information and the color block information in the each information extraction region to obtain the line information and the color block information of the comic image.

Since there are differences in pixel colors on different information extraction regions, that is, different information extraction regions may correspond to image feature information of different frequencies. By setting the corresponding extraction parameter for each information extraction region, targeted extraction of the line information and the color block information in each information extraction region may be achieved, the extraction results of the line information and the color block information may be ensured, which is conducive to further ensure the high-quality display effect of the paper-cut image.

The extraction parameter is used to determine image feature information of a specific frequency to be extracted in each information extraction region, the specific content of the extraction parameter may be determined according to different extraction algorithms, which is not specifically limited in the embodiments of the present disclosure.

Exemplarily, in the embodiments of the present disclosure, the original image is an original image including a target object, the comic image is a comic image of the target object, and the comic image is a comic image corresponding to the original image. The target object may include, for example, a target person, correspondingly, the information extraction region may be a target part region of a target person (such as a face region, a hair region, a body region, etc.) and other regions (such as an image background region) on the comic image except the target part region, where the body region refers to a remaining region in a target person image of the comic image excluding the face region, the hair region, etc. At this time, the line information and the color block information in each information extraction region are acquired based on the extraction parameter corresponding to each information extraction region, for example, the line information and the color block information of the face region are acquired based on the extraction parameter corresponding to the face region, the line information and the color block information of the hair region are acquired based on the extraction parameter corresponding to the hair region, and the line information and the color block information of the body region are acquired based on the extraction parameter corresponding to the body region.

Of course, the target object may also be a target animal, which is similar to the target person, which will not be repeated here.

FIG. 2 is a schematic diagram of an extraction result of line information and color block information provided by an embodiment of the present disclosure. Specifically, an original image including a target person is taken as an example to illustrate the embodiments of the present disclosure, and should not be understood as a specific limitation of the embodiments of the present disclosure. As shown in FIG. 2, if line information (such as the line information of a person's hair region) and color block information (such as the color block information of the person's clothing region) are extracted directly based on the original image, the extracted lines and color blocks are relatively messy, for example, the line information in the hair region has more jaggies, and the color block information in the clothing region has more noise, etc., and a display effect of a final paper-cut image is also poor; if the original image is transformed into a comic image, the line information and the color block information are extracted based on the comic image, the lines obtained from extraction are smoother, the color blocks obtained from extraction are clean, and a display effect of the final paper-cut image is also good.

S104, determine, according to the line information and the color block information of the comic image, a paper-cut image corresponding to the original image.

Exemplarily, according to a preset image color (that is, a preset paper-cut color) and a preset image resolution (which can be specifically determined according to generation requirements of the paper-cut image), image rendering is performed based on the extracted line information and color block information to obtain the paper-cut image corresponding to the original image.

The paper-cut image obtained by adopting the image processing method provided by the embodiments of the present disclosure, and the corresponding original image, may be used as training samples for training a paper-cut style image generation model. The paper-cut style image generation model has a function of generating paper-cut style images, which may be implemented based on any available neural networks such as conditional generative adversarial nets (CGAN), a pixel2pixel network.

In the embodiments of the present disclosure, by extracting line information and color block information based on a comic image of an original image, an extraction effect of the line information and the color block information on the original image is improved. A new paper-cut image generating method is provided by using the line information and the color block information extracted based on the comic image to generate a required paper-cut image, thus ensuring a high-quality display effect of the paper-cut image and enriching an image processing function supported in an electronic device, further enriching transformation types of style images supported in the electronic device, and solving the problem that transformation types of style images supported in existing solutions are limited, stylization effect is undiversified and cannot meet generating requirements of style images from users.

FIG. 3 is a flowchart of another image processing method provided by an embodiment of the present disclosure, which is further optimized and expanded based on the foregoing embodiment, and may be combined with each of the foregoing implementation manners. As shown in FIG. 3, the image processing method provided by the embodiment of the present disclosure may include:

S201, acquire an original image;

S202, determine a comic image corresponding to the original image;

S203, identify one or more information extraction regions on the comic image.

The specific number of information extraction regions may be preset, or may be determined by identifying different color regions on the comic image. The identification of the color regions may be realized by using any available existing image processing algorithms (for example, an image segmentation algorithm, etc.), which is not specifically limited in the embodiments of the present disclosure.

S204, acquire, based on an extraction parameter corresponding to each information extraction region, line information and the color block information in the each information extraction region.

The extraction parameter is used to determine image feature information of a specific frequency to be extracted in each information extraction region, the specific content of the extraction parameter may be determined according to different extraction algorithms, which is not specifically limited in the embodiments of the present disclosure.

Since there are differences in pixel colors on different information extraction regions, that is, different information extraction regions may correspond to image feature information of different frequencies. By setting the corresponding extraction parameter for each information extraction region, targeted extraction of the line information and the color block information in each information extraction region may be achieved, the extraction results of the line information and the color block information may be ensured, and the high-quality display effect of the paper-cut image is further ensured.

In an implementation, the acquiring, based on the extraction parameter corresponding to the each information extraction region, the line information and the color block information in the each information extraction region includes:

acquiring, based on the extraction parameter corresponding to the each information extraction region, candidate line information and candidate color block information corresponding to a respective extraction parameter in the comic image respectively;

determining, from the candidate line information and the candidate color block information of the comic image corresponding to the extraction parameter, the line information and the color block information in the each information extraction region respectively in accordance with the location of the each information extraction region on the comic image.

That is, in an implementation, after one or more information extraction regions on the comic image are determined, the extraction parameter corresponding to each information extraction region may be used to perform one or more extraction operations for line information and color block information on the entire comic image respectively, and each extraction result is used as candidate line information and candidate color block information of the comic image. Then, in accordance with the location of the each information extraction region on the comic image, the line information and the color block information in the each information extraction region are determined respectively from the candidate line information and the candidate color block information of the comic image corresponding to each extraction parameter. For example, using the extraction parameter corresponding to a face region, the extraction operation for line information and color block information is performed on the entire comic image, and the extraction result is used as the candidate line information and the candidate color block information of the comic image (which includes the line information and the color block information of the face region, also includes the line information and the color block information of other regions except the face region on the comic image). And then, according to a location of the face region in the entire comic image, the line information and color block information of the face region are determined from the candidate line information and the candidate color block information of the comic image.

Figure 4:
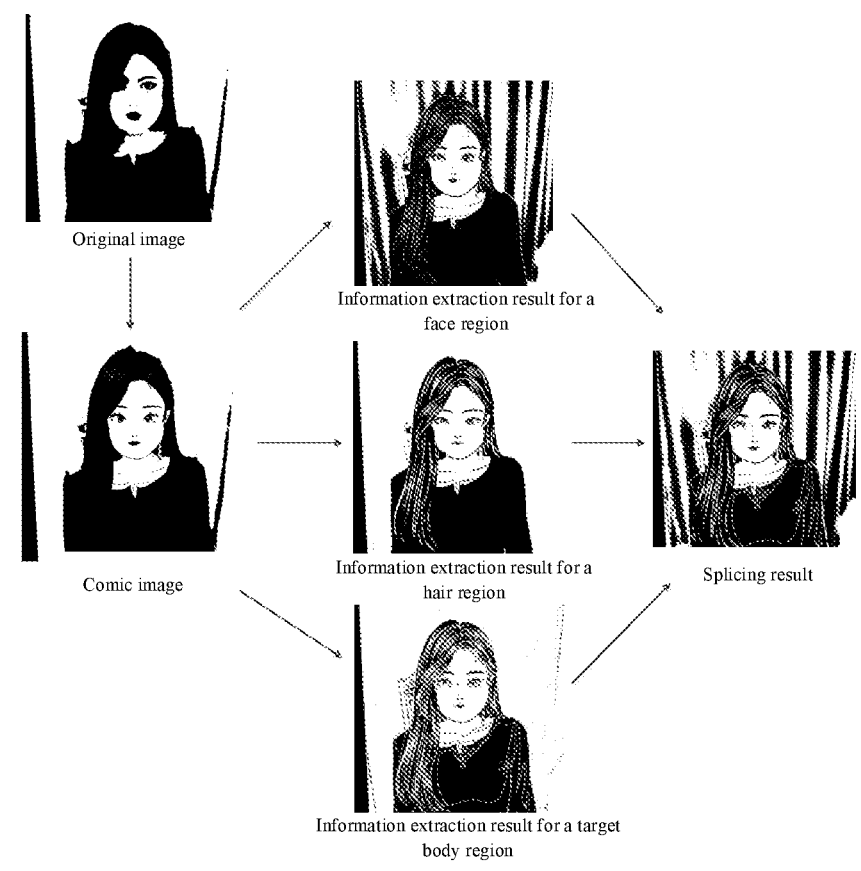
FIG. 4 is a schematic diagram of a paper-cut image obtained by splicing based on extraction results of line information and color block information of multiple information extraction regions provided by an embodiment of the present disclosure.

FIG. 4 is a schematic diagram of a paper-cut image obtained by splicing based on extraction results of line information and color block information of multiple information extraction regions provided by an embodiment of the present disclosure. Specifically, an example is taken where an original image includes a target person and a comic image includes the target person to illustrate the embodiments of the present disclosure, such example should not be understood as a specific limitation of the embodiments of the present disclosure. As shown in FIG. 4, information extraction regions on the comic image may include a face region (including facial features), a hair region, and a target body region (which may include a region including a person's neck and upper body clothing), the corresponding extraction parameter is set for each information extraction region, taking an xdog algorithm as an example, the face region corresponds to one set of xdog parameters, the hair region corresponds to another set of xdog parameters, and the target body region corresponds to yet another set of xdog parameters. For example, by using the extraction parameters corresponding to the face region, an extraction for line information and color block information is performed on the comic image to obtain one kind of candidate line information and candidate color block information of the comic image, as shown in FIG. 4, a schematic diagram of an information extraction result for the face region is shown; by using the extraction parameters corresponding to the hair region, an extraction for line information and color block information is performed on the comic image to obtain one kind of candidate line information and candidate color block information of the comic image, as shown in FIG. 4, a schematic diagram of an information extraction result for the hair region is shown; by using the extraction parameters corresponding to the target body region, an extraction for line information and color block information is performed on the comic image to obtain one kind of candidate line information and candidate color block of the comic image, as shown in FIG. 4, a schematic diagram of an information extraction result for the target body region is shown.

In addition, for a background region on the comic image, an extraction result corresponding to the background region obtained by extracting the line information and the color block information of the comic image using the extraction parameter(s) corresponding to any other information extraction region can be used as the line information and the color block information in the background region. As shown in FIG. 4, after an extraction for line information and color block information is performed on the comic image by using the extraction parameter corresponding to the face region, the extraction result corresponding to the background region in the candidate line information and the candidate color block information of the comic image can be used as the line information and the color block information in the background region, at this time, it can also be considered that the background region and the face region use the same extraction parameter. In addition, the corresponding extraction parameter may also be set separately for the background region, which is not specifically limited in the embodiments of the present disclosure, and may be determined according to display requirements for an image background.

In an implementation, the acquiring, based on the extraction parameter corresponding to the each information extraction region, the line information and the color block information in the each information extraction region includes:

performing, in accordance with a location of the each information extraction region on the comic image, region segmentation on the comic image to obtain a region sub-image corresponding to the each information extraction region;

acquiring, based on the extraction parameter corresponding to the each information extraction region, line information and the color block information of the region sub-image corresponding to the each information extraction region respectively.

That is, in an embodiment, respective information extraction regions on the comic image may be detected by using an image segmentation algorithm, and then the region segmentation is performed on the comic image in accordance with areas of respective regions to obtain the region sub-image corresponding to the each information extraction region. For example, after the face region, the hair region, and the target body region on the comic image including the target person are detected, the region segmentation is performed on the comic image in accordance with these regions to obtain multiple region sub-images, and then extraction for line information and color block information is performed separately on corresponding sub-images in accordance with the extraction parameter corresponding to each information extraction region.

S205, splice, in accordance with a location of a respective information extraction region on the comic image, the line information and the color block information in the respective information extraction region to obtain the line information and the color block information of the comic image.

Continue referring to FIG. 4, after line information and color block information in each information extraction region are obtained, the line information and the color block information in respective information extraction regions are spliced in accordance with the locations of the respective information extraction regions on the comic image, so as to obtain the line information and the color block information of the comic image. For example, line information and color block information in respective information extraction regions are spliced according to a location relationship of the face region, the hair region, the body region, etc., in the comic image, to obtain the line information and the color block information of the comic image including the target person.

S206, determine, according to the line information and color block information of the comic image, a paper-cut image corresponding to the original image.

In the embodiments of the present disclosure, an information extraction effect is improved by targeted extraction of the line information and the color block information on the comic image in accordance with different information extraction regions. However, since different information extraction regions have different extraction parameters, an overall style of the splicing result is not uniform after the extraction results of respective information extraction regions are spliced, and there will still be a lot of jaggies and noise on lines that affect a display effect of the paper-cut image. Thus, a process of generating the paper-cut image may be further optimized in the embodiments of the present disclosure. That is, in an implementation, the determining, according to the line information and the color block information of the comic image, the paper-cut image corresponding to the original image may include: obtaining, according to the line information and the color block information of the comic image, a candidate image; performing preset processing on the candidate image, and obtaining, based on a preset processing result, the paper-cut image corresponding to the original image; where the preset processing includes at least one of removing jaggies on the line information and removing noise on the line information. A removal of jaggies and noise may be implemented by using any available algorithm in the prior art with a function of removing jaggies and noise, which is not specifically limited in the embodiments of the present disclosure.

In an implementation manner, the performing the preset processing on the candidate image, and obtaining, based on the preset processing result, the paper-cut image corresponding to the original image includes:

transforming the candidate image into a vectorized image; specifically, any available existing vectorization technology may be used to transform the candidate image (belonging to a kind of bitmap) into a vectorized image. Any enlargement processing of the image after vectorization may be invulnerable to image distortion, and through vectorization processing, the jaggies and noise on the candidate image may be reduced, thereby realizing an optimization of the candidate image;

rendering, in accordance with a preset image color and a preset image resolution, the vectorized image to obtain the paper-cut image corresponding to the original image. In an implementation, the preset image color includes a color associated with preset festival information, such as red and the like.

Figure 5:
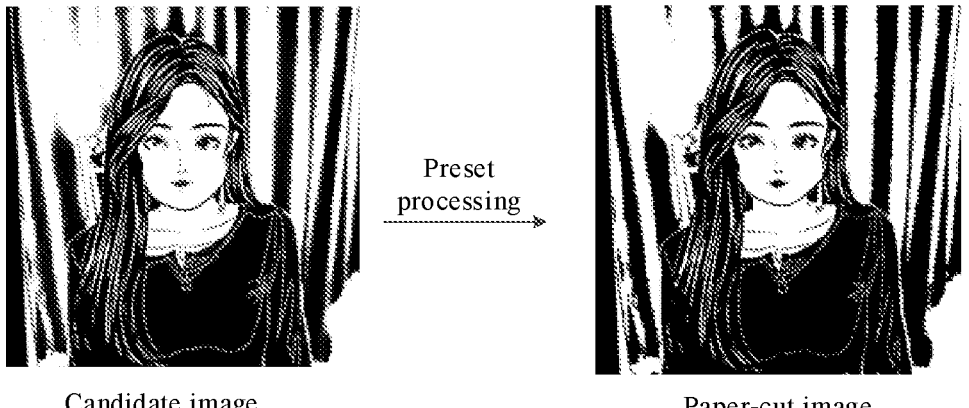
FIG. 5 is a schematic diagram of obtaining a paper-cut image through preset processing provided by an embodiment of the present disclosure.

FIG. 5 is a schematic diagram of obtaining a paper-cut image through preset processing provided by an embodiment of the present disclosure, which is used to exemplarily illustrate the embodiments of the present disclosure. As shown in FIG. 5, the paper-cut image obtained through the foregoing preset processing is almost free of jaggies and noise, showing a good image effect.

In the embodiment of the present disclosure, by performing targeted extraction on the line information and the color block information based on respective information extraction regions on the comic image corresponding to the original image, an extraction effect of the line information and the color block information on the original image is improved; a new paper-cut image generating method is provided by using the line information and the color block information extracted based on the comic image to generate a required paper-cut image, thus ensuring a high-quality display effect of the paper-cut image and enriching an image processing function supported in an electronic device, further enriching transformation types of style images supported in the electronic device, and solving the problem that transformation types of style images supported in existing solutions are limited and cannot meet generating requirements of style images from users.

Figure 6:
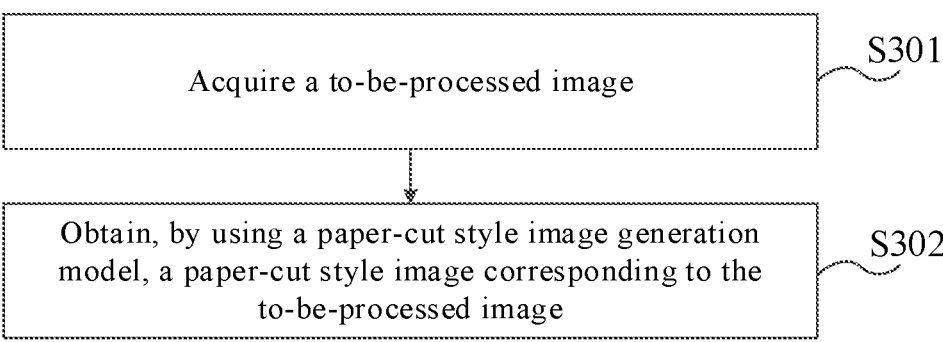
FIG. 6 is a flowchart of an image generating method provided by an embodiment of the present disclosure.

FIG. 6 is a flowchart of an image generating method provided by an embodiment of the present disclosure, which may be applied to a situation of how to generate a paper-cut style image. The image generating method may be performed by an image generating apparatus, which can be implemented by software and/or hardware, and can be integrated on any electronic devices with computing capabilities, such as a mobile smart terminal, a tablet computer, a notebook computer, and the like.

The image generating method provided by the embodiments of the present disclosure is implemented based on a pre-trained paper-cut style image generation model, the paper-cut style image generation model is obtained by training based on an original image and a paper-cut image corresponding to the original image, and the paper-cut image is obtained based on any available image processing methods provided by the embodiments of the present disclosure. That is, the paper-cut image corresponding to the original image may be obtained by using any image processing methods provided by the embodiments of the present disclosure, and the original image and the corresponding paper-cut image may be used as paired training data for training to obtain the paper-cut style image generation model. Compared with directly drawing paper-cut images as training data, the training data obtained by using the above-mentioned image processing method of the present disclosure is more efficient and less expensive. Exemplarily, the paper-cut style image generation model may be implemented based on any available neural networks such as conditional generative adversarial nets (CGAN), a pixel2pixel network, and the like. Reference may be made to the content of the above-mentioned embodiments for the specific explanation of the image processing method.

In addition, in the embodiment of the present disclosure, an image generation solution may be implemented in a form of an independent application or a mini program integrated on a public platform, and may also be implemented as an application with an image editing function or a functional module integrated in a mini program. The application or mini program may include, but is not limited to, a video interaction application or a video interaction mini program, and the like.

As shown in FIG. 6, the image generating method according to the embodiments of the present disclosure may include:

S301, acquire a to-be-processed image.

The to-be-processed image may be any type of image, such as a face image, an animal image, a scenery image, and the like. Exemplarily, the electronic device can obtain the to-be-processed image by invoking a photographing apparatus for shooting, and may also obtain the to-be-processed image through a user's image uploading operation.

S302, obtain, by using a paper-cut style image generation model, a paper-cut style image corresponding to the to-be-processed image.

The paper-cut style image generation model is obtained by training based on the original image and the paper-cut image corresponding to the original image, and the paper-cut image is obtained based on any available image processing methods provided by the embodiments of the present disclosure.

In an implementation, before the acquiring the to-be-processed image, the image generating method provided by the embodiments of the present disclosure further includes:

displaying, in response to a paper-cut style image generation request of a user, an original template image;

after the obtaining, by using the paper-cut style image generation model, the paper-cut style image corresponding to the to-be-processed image, the image generating method provided by the embodiments of the present disclosure further includes:

superimposing and displaying the paper-cut style image on a paper-cut style template image corresponding to the original template image to generate a target image.

The original template image is a preset background image, which may include any type of preset image, which is not specifically limited in the embodiments of the present disclosure. Exemplarily, the user may trigger a paper-cut style image generation request by touching a prop icon corresponding to a template image displayed on an interface of the electronic device, or the user may directly trigger the paper-cut style image generation request by touching a camera button displayed on the interface of the device, or the user may trigger the paper-cut style image generation request through gesture control or voice control, etc.; the electronic device may randomly display one kind of the original template image in response to the paper-cut style image generation request of the user, or display the original template image in accordance with a preset rule. The preset rule may include, for example, displaying in accordance with a popularity of original template images (or the number of times used by a large number of users, specifically counted by a server backend), or displaying in accordance with a default order of original template images, which is not specifically limited in the embodiments of the present disclosure. Of course, after responding to the paper-cut style image generation request of the user, the original template image selected by the user is displayed in accordance with a selection operation of the original template images of the user.

The paper-cut style template image is a template image after paper-cut stylization is performed on the original template image. The paper-cut style template image corresponding to each original template image may also be pre-generated. In a process of generating the target image, the paper-cut style template image corresponding to the currently used original template image may be called in accordance with a corresponding relationship between original template images and paper-cut style template images.

Exemplarily, the original template image provided by the embodiments of the present disclosure may include a template image associated with preset festival information; a color of the paper-cut style image and the paper-cut style template image includes a color associated with the preset festival information, such as red.

Figure 7:
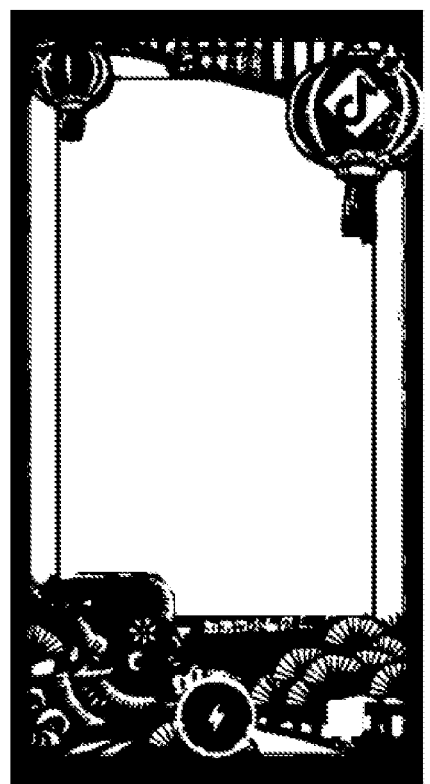
FIG. 7 is a schematic diagram of a paper-cut style template image provided by an embodiment of the present disclosure.

FIG. 7 is a schematic diagram of a paper-cut style template image provided by an embodiment of the present disclosure. As shown in FIG. 7, the paper-cut style template image may include elements related to zodiac, elements related to festival, such as lanterns, etc., at this time, the corresponding original template image includes a lantern element before the paper-cut stylization, and the paper-cut style template image includes the lantern element after the paper-cut stylization. FIG. 8 is a schematic diagram of another paper-cut style template image provided by an embodiment of the present disclosure. As shown in FIG. 8, the paper-cut style template image may include elements related to specific plants. It should be understood that FIG. 7 and FIG. 8 are used as one kind of example to illustrate the paper-cut style template image of the embodiments of the present disclosure, and should not be understood as a specific limitation of the embodiments of the present disclosure.

The displaying of the generated paper-cut style image together with the paper-cut style template image helps to improve a display effect of the style image. For the display effect of the target image, reference may be made to the display effect shown in FIG. 9. FIG. 9 shows the display effect of a target image by specifically taking the paper-cut style template image shown in FIG. 8 and the to-be-processed image as a face image as an example.

In an embodiment, the superimposing and displaying the paper-cut style image on the paper-cut style template image corresponding to the original template image to generate the target image includes:

performing, in accordance with a location of a target object on the paper-cut style image, region segmentation on the paper-cut style image to obtain a region sub-image corresponding to the target object;

superimposing and displaying the region sub-image corresponding to the target object on the paper-cut style template image to generate the target image.

The target object, also known as a shooting subject, is related to a type of the to-be-processed image. Exemplarily, taking the target object as a target person as an example, the to-be-processed image and the corresponding paper-cut style image are both images including the target person, and the region sub-image corresponding to the target object on the paper-cut style image is the image that only displays the target person. An influence of the background region on the paper-cut style image on an overall display effect of the target image may be avoided by superimposing and displaying the region sub-image corresponding to the target object on the paper-cut style template image, that is, the background of the paper-cut style template image may be used as the background of the target image, so as to ensure a uniformity of the overall display style of the image and present a higher image display effect.

In an implementation manner, after the obtaining, by using a paper-cut style image generation model, the paper-cut style image corresponding to the to-be-processed image, the image generating method provided by the embodiments of the present disclosure further includes:

performing feature enhancement processing and/or deblurring processing on the paper-cut style image.

Considering that an input image size of the paper-cut style image generation model is usually a preset size, when the to-be-processed image of the user does not meet the preset size, it usually needs to undergo processing operations such as scaling until it meets a size requirement of the input image. And then the scaled image is inputted into the model and processed by the model to output the style image, the style image output by the model is finally scaled to the same size as the to-be-processed image, so as to obtain and display the paper-cut style image to the user. A scaling operation may easily lead to a blurred display effect of the paper-cut style image, therefore, in order to improve the display effect of the paper-cut style image, the feature enhancement processing and/or the deblurring processing may be performed on the paper-cut style image.

Example 1, the performing the feature enhancement processing on the paper-cut style image includes:

performing blurring processing on the paper-cut style image to obtain a blurry style image; the blurring processing may be implemented by using any available blurring processing algorithm, which is not specifically limited in the embodiments of the present disclosure;

determining, based on the paper-cut style image and the blurry style image, a residual image corresponding to the paper-cut style image;

performing feature enlargement processing on the residual image, and performing superimposing processing on the residual image after the feature enlargement processing and the blurry style image to obtain the paper-cut style image after the feature enhancement processing.

For example, a Gaussian blur algorithm may be used to perform blur processing on a paper-cut style image A to obtain a blurry style image B, where blurry information belongs to a kind of low-frequency information; then, a residual image C is determined based on the paper-cut style image A and the blurry style image B, the residual image C may be represented as $C=A-B$ (representing a subtraction of image features at the same image location), that is, the residual image may be used to represent high-frequency information on the paper-cut style image; finally, the feature enlargement processing is performed on the residual image, which means to perform feature enlargement on the high-frequency information, for example, multiply a preset parameter t by the residual image C, and the superimposing processing is performed on the residual image after the feature enlargement processing and the blurry style image to obtain a paper-cut style image D after the feature enhancement processing, which may be represented as $D=B+t\cdot C$, where the larger the value of the preset parameter t is, the clearer the obtained paper-cut style image D after the feature enhancement processing.

Example 2, the performing the deblurring processing on the paper-cut style image includes:

performing high-frequency information extraction on the paper-cut style image to obtain the paper-cut style image after deblurring processed. Since low-frequency information on the paper-cut style image belongs to a kind of low-frequency information, the high-frequency information can be extracted from the paper-cut style image, for example, by using an xdog algorithm to extract the high-frequency information, so as to achieve a deblurring effect.

FIG. 9 is a schematic diagram of a comparison of paper-cut style images provided by an embodiment of the present disclosure, which is used to exemplarily illustrate paper-cut style images before the feature enhancement processing and/or the deblurring processing and after the feature enhancement processing and/or the deblurring processing in the embodiments of the present disclosure, and should not be understood as a specific limitation of the embodiments of the present disclosure. As shown in FIG. 9, a display effect of the paper-cut style image after the feature enhancement processing and/or the deblurring processing is clearer.

In the embodiments of the present disclosure, the paper-cut style image generation model is obtained by training based on the original image and the paper-cut image corresponding to the original image, and the paper-cut style image corresponding to the to-be-processed image is obtained by using the paper-cut style image generation model, thus solving the problem that transformation types of style images supported in existing solutions are limited and cannot meet generating requirements of style images from users, enriching the transformation types of style images supported by the electronic device, realizing an efficient generation of paper-cut style images, and making style image generation interesting.

Figure 10:
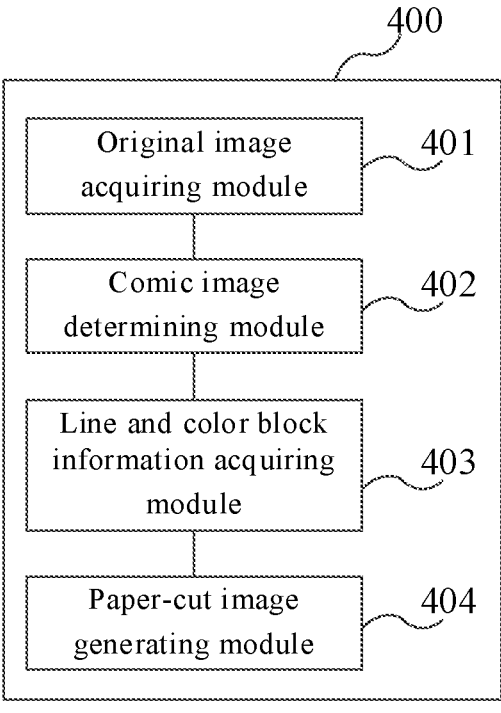
FIG. 10 is a schematic structural diagram of an image processing apparatus provided by an embodiment of the present disclosure.

FIG. 10 is a schematic structural diagram of an image processing apparatus 400 provided by an embodiment of the present disclosure. The apparatus may be implemented by software and/or hardware, and may be integrated on any electronic devices with computing capabilities, such as various user terminals or servers.

As shown in FIG. 10, the image processing apparatus 400 provided by the embodiment of the present disclosure may include an original image acquiring module 401, a comic image determining module 402, a line and color block information acquiring module 403, and a paper-cut image generating module 404, where:

the original image acquiring module 401 is configured to acquire an original image;

the comic image determining module 402 is configured to determine a comic image corresponding to the original image;

the line and color block information acquiring module 403 is configured to acquire line information and color block information of the comic image;

the paper-cut image generating module 404 is configured to determine, according to the line information and the color block information of the comic image, a paper-cut image corresponding to the original image.

In an implementation, the line and color block information acquiring module 403 includes:

an information extraction region identifying unit, configured to identify one or more information extraction regions on the comic image;

a line and color block information extracting unit, configured to acquire, based on an extraction parameter corresponding to each information extraction region, line information and the color block information in the each information extraction region;

an information splicing unit, configured to splice, in accordance with a location of a respective information extraction region on the comic image, the line information and the color block information in the respective information extraction region to obtain the line information and the color block information of the comic image.

In an implementation, the line and color block information extracting unit includes:

a first information obtaining subunit, configured to acquire, based on the extraction parameter corresponding to the each information extraction region, candidate line information and candidate color block information corresponding to a respective extraction parameter in the comic image respectively;

a first information determining subunit, configured to determine, from the candidate line information and the candidate color block information of the comic image corresponding to the extraction parameter, the line information and the color block information in the each information extraction region respectively in accordance with the location of the each information extraction region on the comic image.

In an implementation, the line and color block information extracting unit includes:

a region segmenting subunit, configured to perform, in accordance with a location of the each information extraction region on the comic image, region segmentation on the comic image to obtain a region sub-image corresponding to the each information extraction region;

a second information acquiring subunit, configured to acquire, based on the extraction parameter corresponding to the each information extraction region, line information and the color block information of the region sub-image corresponding to the each information extraction region respectively.

In an implementation, the paper-cut image generating module 404 includes:

a candidate image determining unit, configured to obtain, according to the line information and the color block information of the comic image, a candidate image;

a preset processing unit, configured to perform preset processing on the candidate image, and obtain, based on a preset processing result, the paper-cut image corresponding to the original image; where the preset processing includes at least one of removing jaggies on the line information and removing noise on the line information.

In an implementation, the preset processing unit includes:

an image transforming subunit, configured to transform the candidate image into a vectorized image;

an image rendering subunit, configured to render, in accordance with a preset image color and a preset image resolution, the vectorized image to obtain the paper-cut image corresponding to the original image.

The image processing apparatus provided by the embodiments of the present disclosure may execute any image processing methods provided by the embodiments of the present disclosure, and has corresponding functional modules for executing the methods and beneficial effects corresponding to execution of the methods. For the content not fully described in the apparatus embodiments of the present disclosure, reference may be made to the description in any method embodiments of the present disclosure.

Figure 11:
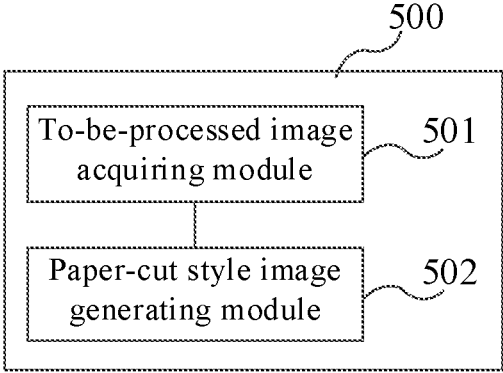
FIG. 11 is a schematic structural diagram of an image generating apparatus provided by an embodiment of the present disclosure.

FIG. 11 is a schematic structural diagram of an image generating apparatus provided by an embodiment of the present disclosure. The apparatus may be implemented by software and/or hardware, and may be integrated on any electronic devices with computing capability, such as a mobile smart terminal, a tablet computer, a Laptop, and the like.

As shown in FIG. 11, the image generating apparatus 500 provided by the embodiments of the present disclosure may include a to-be-processed image acquiring module 501 and a paper-cut style image generating module 502, where:

the to-be-processed image acquiring module is configured to acquire a to-be-processed image;

the paper-cut style image generating module 502 is configured to obtain, by using a paper-cut style image generation model, a paper-cut style image corresponding to the to-be-processed image;

where the paper-cut style image generation model is obtained by training based on an original image and a paper-cut image corresponding to the original image, and the paper-cut image is obtained based on any one of image processing methods provided by the embodiments of the present disclosure.

In an implementation, the image generating apparatus 500 provided by the embodiment of the present disclosure may further include:

a template image displaying module, configured to display, in response to a paper-cut style image generation request of a user, an original template image;

a target image generating module, configured to superimpose and display the paper-cut style image on a paper-cut style template image corresponding to the original template image to generate a target image.

In an implementation, the target image generating module includes:

a region segmenting unit, configured to perform, in accordance with a location of a target object on the paper-cut style image, region segmentation on the paper-cut style image to obtain a region sub-image corresponding to the target object;

a superimposing and displaying unit, configured to superimpose and display the region sub-image corresponding to the target object on the paper-cut style template image to generate the target image.

In an implementation, the image generating apparatus 500 provided by the embodiments of the present disclosure may further include:

a style image processing module, configured to perform feature enhancement processing and/or deblurring processing on the paper-cut style image.

In an implementation, the style image processing module includes:

a blurring processing unit, configured to perform blurring processing on the paper-cut style image to obtain a blurry style image;

a residual image determining unit, configured to determine, based on the paper-cut style image and the blurry style image, a residual image corresponding to the paper-cut style image;

an image superimposing processing unit, configured to perform superimposing processing on the residual image after the feature enlargement processing and the blurry style image to obtain the paper-cut style image after the feature enhancement processing.

In an implementation, the style image processing module includes:

a high-frequency information extracting unit, configured to perform high-frequency information extraction on the paper-cut style image to obtain the paper-cut style image after deblurring processed.

The image generating apparatus provided by the embodiments of the present disclosure may execute any image generating methods provided by the embodiments of the present disclosure, and has corresponding functional modules for executing the methods and beneficial effects corresponding to execution of the methods. For the content not fully described in the apparatus embodiments of the present disclosure, reference may be made to the description in any method embodiments of the present disclosure.

Figure 12:
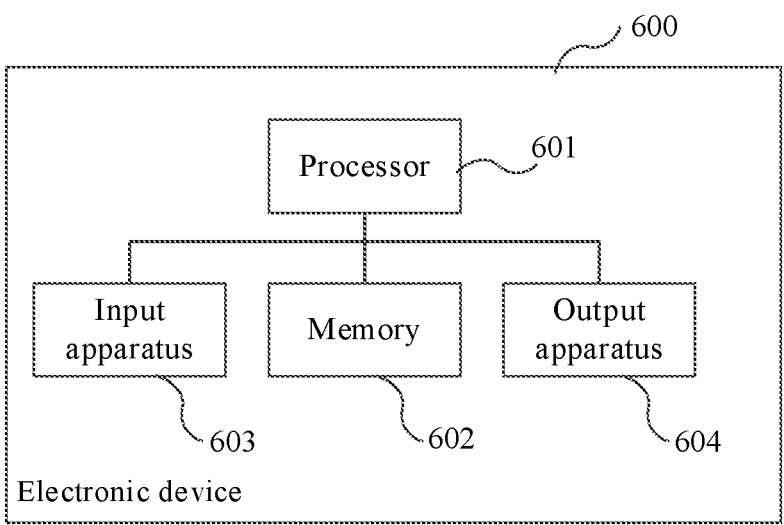
FIG. 12 is a schematic structural diagram of an electronic device provided by an embodiment of the present disclosure.

FIG. 12 is a schematic structural diagram of an electronic device provided by an embodiment of the present disclosure, which is used to exemplarily illustrate an electronic device that implements an image processing method or an image generating method according to the embodiments of the present disclosure. The electronic device in the embodiments of the present disclosure may include, but is not limited to, a mobile terminal such as a mobile phone, a notebook computer, a digital broadcast receiver, a PDA (personal digital assistant), a PAD (tablet computer), a PMP (portable multimedia player), an in-vehicle terminal (for example, an in-vehicle navigation terminal), etc., and a stationary terminal such as a digital TV, a desktop computer, a smart home device, a wearable electronic device, a server, and the like. The electronic device shown in FIG. 12 is only an example, and should not impose any limitation on a function and an occupancy scope of the embodiments of the present disclosure.

As shown in FIG. 12, the electronic device 600 includes one or more processors 601 and a memory 602.

The processor 601 may be a central processing unit (CPU) or other form of processing units having data processing capabilities and/or instruction execution capabilities, and may control other components in electronic device 600 to perform desired functions.

The memory 602 may include one or more computer program products, which may include various forms of computer readable storage mediums, such as a volatile memory and/or a non-volatile memory. The volatile memory may include, for example, a random access memory (RAM) and/or a cache memory (cache), and the like. The non-volatile memory may include, for example, a read only memory (ROM), a hard disk, a flash memory, and the like. One or more computer program instructions may be stored on the computer readable storage medium, the processor 601 may execute the program instructions to implement the image processing method or the image generating method according to the embodiments of the present disclosure, and may also implement other desired functions. Various contents such as an input signal, a signal component, a noise component, etc. may also be stored in the computer readable storage medium.

On the one hand, the image processing method provided by the embodiments of the present disclosure may include: acquiring an original image; determining a comic image corresponding to the original image; acquiring line information and color block information of the comic image; determining, according to the line information and the color block information, a paper-cut image corresponding to the original image.

On the other hand, the image generating method provided by the embodiments of the present disclosure may include: acquiring a to-be-processed image; obtaining, by using a paper-cut style image generation model, a paper-cut style image corresponding to the to-be-processed image; where the paper-cut style image generation model is obtained by training based on an original image and a paper-cut image corresponding to the original image, and the paper-cut image is obtained based on any image processing methods provided by the embodiments of the present disclosure.

It should be understood that the electronic device 600 may also execute other implementations provided by the method embodiments of the present disclosure.

In one example, the electronic device 600 may also include an input apparatus 603 and an output apparatus 604, which are interconnected by a bus system and/or other forms of connection mechanism (not shown).

In addition, the input apparatus 603 may also include, for example, a keyboard, a mouse, and the like.

The output apparatus 604 can output various information to the outside, including determined distance information, direction information, and the like. The output apparatus 604 may include, for example, a display, a speaker, a printer, and a communication network and its connected remote output devices, and the like.

Of course, for simplicity, only some of the components in the electronic device 600 related to the present disclosure are shown in FIG. 12, and components such as buses, input/output interfaces, and the like are omitted. Besides, the electronic device 600 may also include any other suitable components according to specific applications.

In addition to the above method and device, the embodiments of the present disclosure also provide a computer program product, which includes computer programs or computer program instructions, when the computer programs or computer program instructions are executed by a computing device, the computing device is enabled to implement any image processing methods or image generating methods provided by the embodiments of the present disclosure.

A program code used to perform operations of the present disclosure may be written in one or more programming languages or a combination thereof by the computer program product. The programming languages include an object-oriented programming language, such as Java, C++, etc., and also include a conventional procedural programming language, such as "C" language or similar programming language. The program code may be executed entirely on a user electronic device, partly on a user electronic device, executed as an independent software package, partly executed on a user electronic device and partly executed on a remote electronic device, or entirely executed on a remote electronic device.

In addition, the embodiments of the present disclosure may further provide a computer readable storage medium, having computer program instructions stored thereon, and when the computer program instructions are executed by a computing device, the computing device is enabled to implement any image processing methods or image generating methods according to the embodiments of the present disclosure.

On the one hand, the image processing method according to the embodiments of the present disclosure may include: acquiring an original image; determining a comic image corresponding to the original image; acquiring line information and color block information of the comic image; determining, according to the line information and the color block information, a paper-cut image corresponding to the original image.

On the other hand, the image generating method according to the embodiments of the present disclosure may include: acquiring a to-be-processed image; obtaining, by using a paper-cut style image generation model, a paper-cut style image corresponding to the to-be-processed image; where the paper-cut style image generation model is obtained by training based on an original image and a paper-cut image corresponding to the original image, and the paper-cut image is obtained based on any image processing methods provided by the embodiments of the present disclosure.

It should be understood that when the computer program instructions are executed by the computing device, the computing device may also implement other implementations provided by the method embodiments of the present disclosure.

A computer readable storage medium may adopt any combination of one or more readable mediums. The readable medium may be a readable signal medium or a readable storage medium. The readable storage medium may include, for example, but not limited to, an electrical, magnetic, optical, electromagnetic, infrared, or semiconductor system, apparatus or device, or any combination of the above. More specific examples (non-exhaustive list) of the readable storage medium include: an electrical connection with one or more wires, a portable computer disk, a hard disk, a random access memory (RAM), a read only memory (ROM), an erasable programmable read only memory (EPROM or flash memory), an optical fiber, a portable compact disk read only memory (CD-ROM), an optical storage device, a magnetic storage device, or any suitable combination of the above.

It should be noted that, relational terms herein such as "first" and "second" etc. are merely used to distinguish one entity or operation from another entity or operation, and do not necessarily require or imply any actual relationship or order between these entities or operations. Moreover, the terms "include", "contain" or any other variation thereof are intended to encompass non-exclusive inclusion such that a process, method, article or device including a list of elements includes not only those elements, but also includes other elements that are not explicitly listed, or elements inherent in such a process, method, article or device. Without further limitation, an element limited by a sentence "including a . . . " does not exclude the existence of other identical elements in the process, method, article, or device that includes the element.

The above description is only specific embodiments of the present disclosure, so that those skilled in the art can understand or implement the present disclosure. Various modifications to these embodiments will be obvious to those skilled in the art, and the generic principles defined herein may be implemented in other embodiments without departing from the spirit or scope of the present disclosure. Therefore, the present disclosure will not be limited to the embodiments herein, but will be in accordance with the widest scope consistent with the principles and novel features disclosed herein.

What is claimed is:

1. An image processing method, comprising:

acquiring an original image;

determining a comic image corresponding to the original image;

acquiring line information and color block information of the comic image; and determining, according to the line information and the color block information of the comic image, a paper-cut image corresponding to the original image, wherein the determining, according to the line information and the color block information of the comic image, the paper-cut image corresponding to the original image comprises:

obtaining, according to the line information and the color block information of the comic image, a candidate image; and performing preset processing on the candidate image, and obtaining, based on a preset processing result, the paper-cut image corresponding to the original image, wherein the preset processing comprises at least one of removing jaggies on the line information and removing noise on the line information.

2. The method according to claim 1, wherein the acquiring the line information and the color block information of the comic image comprises:

identifying one or more information extraction regions on the comic image;

acquiring, based on an extraction parameter corresponding to each information extraction region, line information and the color block information in the each information extraction region;

splicing, in accordance with a location of a respective information extraction region on the comic image, the line information and the color block information in the respective information extraction region to obtain the line information and the color block information of the comic image.

3. The method according to claim 2, wherein the acquiring, based on the extraction parameter corresponding to the each information extraction region, the line information and the color block information in the each information extraction region comprises:

acquiring, based on the extraction parameter corresponding to the each information extraction region, candidate line information and candidate color block information corresponding to a respective extraction parameter in the comic image respectively;

determining, from the candidate line information and the candidate color block information of the comic image corresponding to the extraction parameter, the line information and the color block information in the each information extraction region respectively in accordance with the location of the each information extraction region on the comic image.

4. The method according to claim 2, wherein the acquiring, based on the extraction parameter corresponding to the each information extraction region, the line information and the color block information in the each information extraction region comprises:

performing, in accordance with a location of the each information extraction region on the comic image, region segmentation on the comic image to obtain a region sub-image corresponding to the each information extraction region;

acquiring, based on the extraction parameter corresponding to the each information extraction region, line information and the color block information of the region sub-image corresponding to the each information extraction region respectively.

5. The method according to claim 1, wherein the performing the preset processing on the candidate image, and obtaining, based on the preset processing result, the paper-cut image corresponding to the original image comprises:

transforming the candidate image into a vectorized image; and rendering, in accordance with a preset image color and a preset image resolution, the vectorized image to obtain the paper-cut image corresponding to the original image.

6. An image generating method, comprising:

acquiring a to-be-processed image;

obtaining, by using a paper-cut style image generation model, a paper-cut style image corresponding to the to-be-processed image;

wherein the paper-cut style image generation model is obtained by training based on an original image and a paper-cut image corresponding to the original image, and the paper-cut image is obtained based on the image processing method according to claim 1.

7. The method according to claim 6, wherein before the acquiring the to-be-processed image, the method further comprises:

displaying, in response to a paper-cut style image generation request of a user, an original template image;

after the obtaining, by using the paper-cut style image generation model, the paper-cut style image corresponding to the to-be-processed image, the method further comprises:

superimposing and displaying the paper-cut style image on a paper-cut style template image corresponding to the original template image to generate a target image.

8. The method according to claim 7, wherein the superimposing and displaying the paper-cut style image on the paper-cut style template image corresponding to the original template image to generate the target image comprises:

performing, in accordance with a location of a target object on the paper-cut style image, region segmentation on the paper-cut style image to obtain a region sub-image corresponding to the target object;

superimposing and displaying the region sub-image corresponding to the target object on the paper-cut style template image to generate the target image.

9. The method according to claim 6, wherein after the obtaining, by using the paper-cut style image generation model, the paper-cut style image corresponding to the to-be-processed image, the method further comprises:

performing feature enhancement processing and/or deblurring processing on the paper-cut style image.

10. The method according to claim 9, wherein the performing the feature enhancement processing on the paper-cut style image comprises:

performing blurring processing on the paper-cut style image to obtain a blurry style image;

determining, based on the paper-cut style image and the blurry style image, a residual image corresponding to the paper-cut style image;

performing feature enlargement processing on the residual image, and performing superimposing processing on the residual image after the feature enlargement processing and the blurry style image to obtain the paper-cut style image after the feature enhancement processing.

11. The method according to claim 9, wherein the performing the deblurring processing on the paper-cut style image comprises:

performing high-frequency information extraction on the paper-cut style image to obtain the paper-cut style image after deblurring processed.

12. An image generating apparatus, comprising: one or more processors and a memory, wherein computer programs are stored in the memory, and when the computer programs are executed by the one or more processors, the image processing method according to claim 6 is implemented.

13. An image processing apparatus, comprising: one or more processors and a memory, wherein computer programs are stored in the memory, and when the computer programs are executed by the one or more processors, the one or more processors are enabled to:

acquire an original image;

determine a comic image corresponding to the original image;

acquire line information and color block information of the comic image; and determine, according to the line information and the color block information of the comic image, a paper-cut image corresponding to the original image, wherein when the computer programs are executed by the one or more processors, the one or more processors are further enabled to:

obtain, according to the line information and the color block information of the comic image, a candidate image; and perform preset processing on the candidate image, and obtain, based on a preset processing result, the paper-cut image corresponding to the original image, wherein the preset processing comprises at least one of removing jaggies on the line information and removing noise on the line information.

14. The apparatus according to claim 13, wherein when the computer programs are executed by the one or more processors, the one or more processors are further enabled to:

identify one or more information extraction regions on the comic image;

acquire, based on an extraction parameter corresponding to each information extraction region, line information and the color block information in the each information extraction region;

splice, in accordance with a location of a respective information extraction region on the comic image, the line information and the color block information in the respective information extraction region to obtain the line information and the color block information of the comic image.

15. The apparatus according to claim 14, wherein when the computer programs are executed by the one or more processors, the one or more processors are further enabled to:

acquire, based on the extraction parameter corresponding to the each information extraction region, candidate line information and candidate color block information corresponding to a respective extraction parameter in the comic image respectively;

determine, from the candidate line information and the candidate color block information of the comic image corresponding to the extraction parameter, the line information and the color block information in the each information extraction region respectively in accordance with the location of the each information extraction region on the comic image.

16. The apparatus according to claim 14, wherein when the computer programs are executed by the one or more processors, the one or more processors are further enabled to:

perform, in accordance with a location of the each information extraction region on the comic image, region segmentation on the comic image to obtain a region sub-image corresponding to the each information extraction region;

acquire, based on the extraction parameter corresponding to the each information extraction region, line information and the color block information of the region sub-image corresponding to the each information extraction region respectively.

17. The apparatus according to claim 13, wherein when the computer programs are executed by the one or more processors, the one or more processors are further enabled to:

transform the candidate image into a vectorized image;

render, in accordance with a preset image color and a preset image resolution, the vectorized image to obtain the paper-cut image corresponding to the original image.

18. A non-transitory computer readable storage medium, having computer programs stored thereon, wherein when the computer programs are executed by a computing device, the computing device is enabled to implement the following steps:

acquiring an original image;

determining a comic image corresponding to the original image;

acquiring line information and color block information of the comic image; and determining, according to the line information and the color block information of the comic image, a paper-cut image corresponding to the original image, wherein when the computer programs are executed by the computing device, the computing device is enabled to further implement the following steps:

obtaining, according to the line information and the color block information of the comic image, a candidate image; and performing preset processing on the candidate image, and obtaining, based on a preset processing result, the paper-cut image corresponding to the original image, wherein the preset processing comprises at least one of removing jaggies on the line information and removing noise on the line information.

* * * * *